June 21, 1966 H. R. CEDERBERG ETAL 3,257,056

PRESSURE ADJUSTMENT MECHANISM FOR MAGNETIC TAPE CAPSTAN

Filed Jan. 27, 1964

INVENTORS.
Howard R. Cederberg
BY William C. Bortzfield

Hovey, Schmidt, Johnson & Hovey
ATTORNEYS.

United States Patent Office 3,257,056

Patented June 21, 1966

3,257,056

PRESSURE ADJUSTMENT MECHANISM FOR MAGNETIC TAPE CAPSTAN

Howard R. Cederberg and William C. Bortzfield, Tulsa, Okla., assignors to Midwestern Instruments, Inc., Tulsa, Okla., a corporation of Delaware Filed Jan. 27, 1964, Ser. No. 340,460
3 Claims. (Cl. 226—176)

This invention relates to mechanism for maintaining magnetic tape in engagement with a rotating capstan and, more specifically, to improved means for adjusting the pressure on the tape during operation of the tape transport.

In tape transports of the type that employ a rotating capstan in pressure engagement with the tape for the purpose of unreeling the latter from a supply spool, some means is usually provided for maintaining the tape in contact with the capstan to prevent slippage of the tape thereon. Since the tape must be maintained at a constant, predetermined speed it is important that there be no slippage between the capstan and the tape. Manifestly, tape slippage necessarily results in distortion of the signals being recorded or transcribed, especially in high fidelity audio applications.

A pressure roller having a resilient surface is commonly used to hold the tape in engagement with the capstan. The capstan and the roller are disposed such that the tape is sandwiched therebetween when it is desired to drive the tape. The roller should be biased toward the capstan with sufficient force to maintain the tape in engagement with the capstan without unduly loading the bearings of either the capstan or the roller. Manifestly, adjustment of the roller pressure is required during fabrication of the transport and subsequently during replacement of the roller or capstan. Mechanism commonly employed heretofore for this purpose has usually performed satisfactorily, but has presented the disadvantages of being inaccessible from the front panel of the machine or unable to provide a fine pressure adjustment.

It is, therefore, the primary object of this invention to provide a pressure adjustment mechanism for the pressure roller of a tape transport which is conveniently accessible during fabrication and servicing of the transport, adjustable with a minimum of operator effort, and sufficiently sensitive to provide a fine pressure adjustment.

Another important object of this invention is to provide a pressure mechanism as aforesaid that may be adjusted during operation of the transport so that the pressure on the tape may be set under actual operating conditions.

It is another object of this invention to provide pressure adjustment mechanism for a magnetic tape-engaging roller employing a pair of adjusting bolts or the like, one of which is employed to lock the mechanism after the pressure is set, the other bolt being utilized to adjust the pressure while the mechanism is unlocked.

Still another object of this invention is to provide a pressure adjustment mechanism as aforesaid wherein the pressure is applied to the roller by a resilient member, the stress in the member being adjustable by shifting an element of the mechanism toward and away from the member, such shifting being accomplished by an eccentric device.

Other objects will become apparent as the detailed description proceeds.

Figure 1:
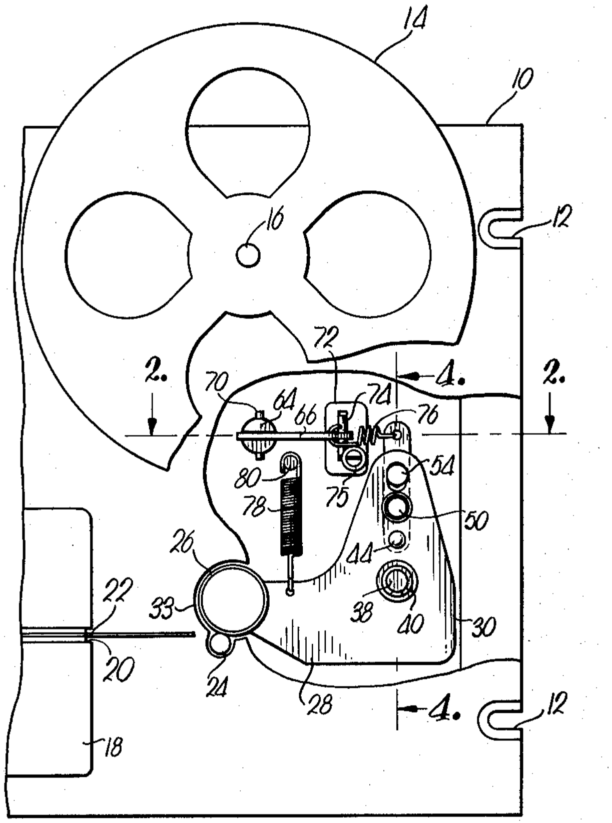
FIGURE 1 is a fragmentary, front elevational view of the front panel of a tape transport, the panel being cutaway to reveal the instant invention.

Referring primarily to FIG. 1 at the outset, the numeral 10 denotes the front panel of a tape transport which may be of the rack-mounted type, as illustrated by the notches 12 in the edge of the panel. A tape reel or spool 14 is mounted on a spindle 16 extending through panel 10. A hood 18 (seen only fragmentarily) serves as a housing for the recording and transcribing heads of the recording and reproducing apparatus (not shown). Hood 18 has a slot 20 therein receiving magnetic tape 22.

It should be understood that tape 22 is trained between reel 14 and a similar reel mounted elsewhere on the panel in the conventional manner. One of the reels serves as a supply reel, while the other is employed as a take-up reel during driving of tape 22 by a rotating capstan 24. Capstan 24 is of conventional construction for tape drives of this type and comprises a shaft having a highly machined surface which may, for example, extend from the hub of a flywheel (not shown).

Driving of the tape is effected by engaging the tape with the capstan and applying pressure against the tape by a roller 26. In effect, therefore, the tape is sandwiched between capstan 24 and roller 26 when advancement of tape is desired. It should be noted that, in FIG. 1, the tape is broken off for clarity, it being understood that tape 22 actually separates capstan 24 and roller 26.

Roller 26 is mounted on an arm 28 which forms a part of an ear-shaped plate 30. Plate 30 is mounted within the transport between panel 10 and chassis 32. An axle assembly and spacer 31 couples roller 26 with arm 28 and extends through an opening 33 in panel 10. Thus, roller 26 is disposed forwardly of panel 10 while arm 28 and the mechanism to be described hereinafter is disposed within the transport but adjacent the rearward side of the panel.

A bearing or spacer 34 having an axial opening 36 therethrough is secured to plate 30 and is free to rotate on an axle 38 which is rotatably received by opening 36. Only the ends of axle 38 are visible in the figures. Axle 38 is secured to chassis 32 by any suitable means, a retainer in the form of a C-clip 40 being employed to prevent plate 30 from slipping off the axle.

Figure 4:
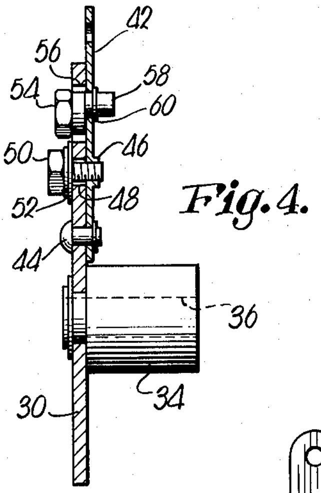
FIG. 4 is a fragmentary view partially in section and partially in elevation taken along line 4—4 of FIG. 1.

An upstanding, elongated element 42 in the form of a strip is pivotally mounted at one end thereof on plate 30 by a pivot pin 44. A boss 46 on element 42 is aligned with a laterally extending slot 48 in plate 30. Boss 46 receives a threaded fastener 50 in the form of a bolt which extends through slot 48. Washers 52 are disposed between the head of fastener 50 and plate 30, as is clearly revealed in FIG. 4.

A rotatable, eccentric device 54 is received by an opening 56 in plate 30. Device 54 includes a stud 58 as an integral part thereof, stud 58 being eccentrically disposed with respect to the normal axis of rotation of the device. The stud is rotatably received by a conjugate opening in element 42, retainer 60 serving to maintain device 54 on the element.

Figure 2:
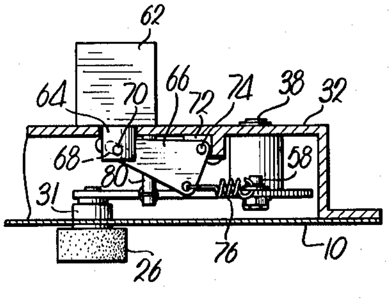
FIG. 2 is a fragmentary view partially in section and partially in elevation taken along line 2—2 of FIG. 1.
Figure 5:
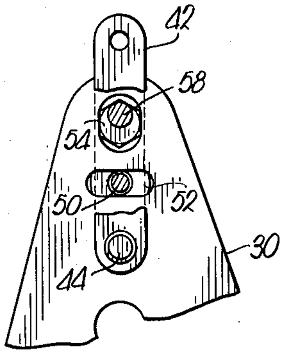
FIG. 5 is a detailed view similar to FIG. 3 except that the reverse side of the mounting plate is shown, the element being broken away to reveal details of construction.

A solenoid 62 is employed to maintain roller 26 in the position shown wherein pressure is applied to tape 22. Solenoid 62 is provided with an armature 64 having a laterally extending slot therethrough receiving one apex of a triangular plate 66. Plate 66 is slotted at 68 as shown in dotted lines in FIG. 2, slot 68 receiving a vertical pin 70 rigid with armature 64.

Another apex of plate 66 is pivotally mounted on chassis 32 by means of a mounting block 72 rigid with the chassis. A vertical slot in block 72 receives a vertical pin 74 which extends through an opening in plate 66, the plate being received by a lateral slot in block 72 intersecting the slot which receives pin 74. Pin 74 is retained in its corresponding slot by a bolt and washer assembly 75. Thus, plate 66 is mounted on the chassis for swinging movement about pin 74 in the plane of the plate.

Armature 64, plate 66, and its associated structure, are linked with element 42 by way of a spring 76 interconnecting the remaining apex of plate 66 with the normally uppermost end of the element. Solenoid 62 is shown in its energized state with armature 64 retracted and spring 76 attenuated; therefore, plate 30 and arm 28 are biased in a counterclockwise direction about axle 38 and roller 26 is forced into engagement with tape 22. A spring 78 connected with arm 28 and a stud 80 extending from chassis 32 is attenuated when the components of the mechanism are in the positions shown, spring 78 thus serving to move roller 26 away from capstan 24 when solenoid 62 is de-energized.

In the operation of the mechanism, solenoid 62 is energized to swing plate 66 in a clockwise direction (as viewed in FIG. 2) about pin 74. This, in turn, moves plate 30 in a counterclockwise direction (as viewed in FIG. 1) about axle 38 as discussed above to place roller 26 in engagement with tape 22. The tape will now be advanced by the rotating capstan 24 if sufficient pressure is exerted by roller 26 to frictionally engage the tape and capstan.

It should be understood that spring 76 attenuates upon energization of solenoid 62 and thus controls the amount of pressure that is applied to the roller. (The effect of spring 76 will be offset by the return spring 78, but this latter spring may be constructed so as to exert a relatively small opposing force since its only function is to move roller 26 a sufficient distance away from the tape upon de-energization of solenoid 62 to uncouple the tape from the capstan.) Fastener 50 normally is firmly set so as to rigidly interlock element 42 in plate 30. Thus, element 42 does not pivot about pin 44 when solenoid 62 is energized.

Figure 3:
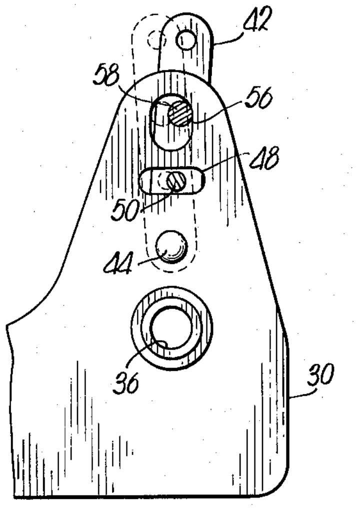
FIG. 3 is an enlarged, detailed view of the mounting plate and the shiftable element, the fastener and the eccentric stud being revealed in cross section.

Assuming now that the solenoid is energized and the various components of the mechanism are in the positions as shown in the figures, adjustment of the pressure exerted by the action of spring 76 on roller 26 is accomplished as follows. A pair of socket wrenches or other suitable tools are each engaged, respectively, with the heads of fastener 50 and device 54. Fastener 50 is then loosened, whereupon device 54 may be rotated to swing element 42 about pin 44. This action is illustrated in FIG. 3 where it may be seen that the eccentrically disposed stud 58 on device 54 forces the larger diameter, main body portion of the device to describe an eccentric path within the confines of opening 56. It should be noted that the axis of rotation of device 54 extends axially through stud 58.

Attention is directed to the fact that the vertical dimension of opening 56 is greater than the lateral dimension thereof. It will be appreciated that this permits movement of device 54 in opening 56 between the two positions illustrated by the solid lines and the dotted lines in FIG. 3. Furthermore, it is evident that the elongated slot 48 allows fastener 50 to shift with element 42 during adjustment of the disposition thereof. Fastener 50 is re-tightened once the desired pressure for roller 26 is obtained.

The adjustment procedure described above may be supplemented by connecting a scale to arm 28 or axle assembly 31 to indicate the amount of force being applied by spring 76 to roller 26. Manifestly, the indication on the scale in pounds or kilograms when roller 26 is forced to move away from the capstan against the action of spring 76 is indicative of the pressure on the roller.

Since adjustment of the mechanism of the instant invention is generally needed only during assembly of the tape transport and subsequent periodic servicing, access to the adjustable components is prevented by panel 10. It is contemplated, however, that panel 10 is of the type which is readily removable when servicing of the equipment is desired. With the panel removed, it is evident that operation of the adjusting mechanism may be conveniently accomplished.

Having thus described the invention, what is claimed as new and desired to be secured by Letters Patent is:

1. In a tape transport having a capstan and a roller for engaging opposed sides of the tape to sandwich the latter therebetween, the combination with said roller of:
 shiftable structure mounting the roller for swinging movement toward and away from the capstan, said structure including a plate having an opening through the major plane thereof;
 an element pivotally mounted on said plate;
 a releasable fastener intercoupling the element and the plate for preventing relative movement of the same except upon release of the fastener;
 a resilient member coupled with said element and biasing the latter in a direction to force the roller toward the capstan; and
 a rotatable device eccentrically mounted on the element and received by said opening for shifting the element toward and away from the member upon rotation of the device and release of the fastener, whereby to selectively vary the stress in the member to adjust the pressure of the tape on the capstan.

2. The invention of claim 1, wherein said member comprises a spring, there being means connected to the spring and attenuating the latter.

3. In a tape transport having a capstan and a roller for engaging opposed sides of the tape to sandwich the latter therebetween, the combination with said roller of:
 shiftable structure mounting the roller for movement toward and away from the capstan, and including a plate having an opening through the major plane thereof;
 an element shiftably mounted on said plate;
 a resilient member coupled with said element and biasing the latter and the plate in a direction to force the roller toward the capstan; and
 a rotatable device eccentrically mounted on said element and received by said opening for shifting the element toward and way from the member upon rotation of the device, whereby to selectively vary the stress in the member to thereby adjust the pressure of the tape on the capstan.

References Cited by the Examiner

UNITED STATES PATENTS

| | | | |
|---|---|---|---|
| 2,178,242 | 10/1939 | Runge | 226—84 |
| 2,775,449 | 12/1956 | Stempel | 266—187 X |
| 2,943,852 | 7/1960 | Quirk | 266—187 X |
| 3,093,284 | 6/1963 | Mullin | 226—176 |

M. HENSON WOOD, Jr., *Primary Examiner.*

ROBERT B. REEVES, *Examiner.*

R. A. SCHACHER, *Assistant Examiner.*